No. 764,597. PATENTED JULY 12, 1904.
G. W. KAISER.
PRESSURE REDUCING VALVE FOR AIR BRAKES.
APPLICATION FILED NOV. 19, 1903.
NO MODEL.
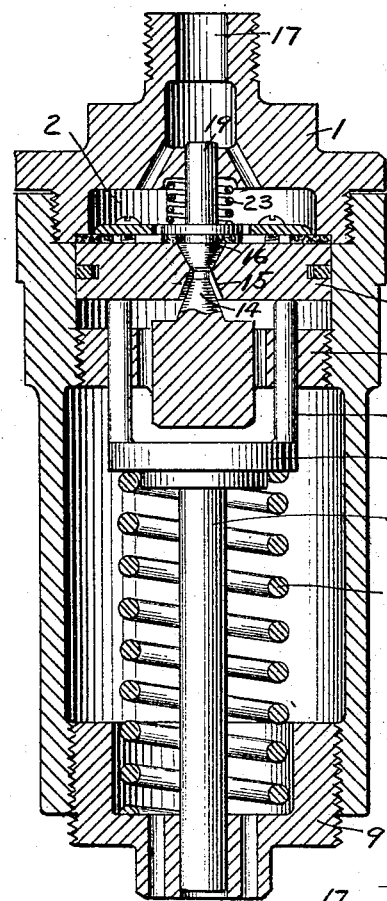
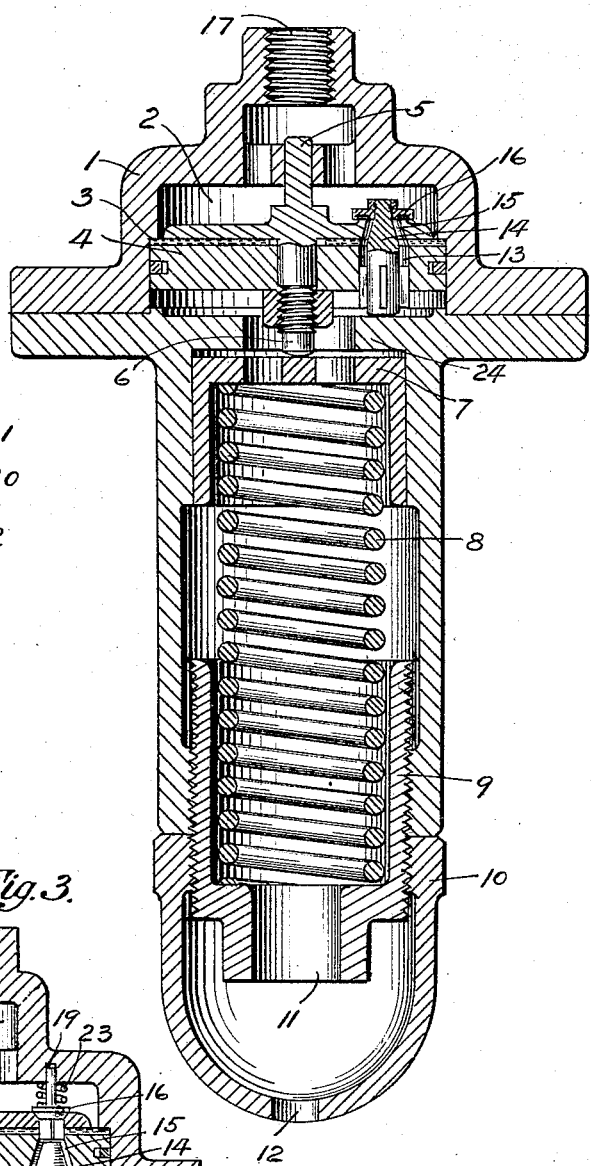
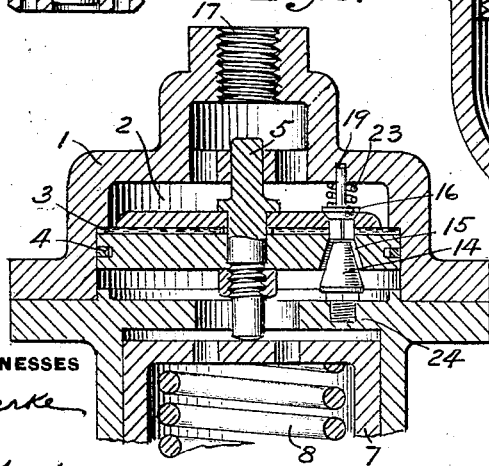
WITNESSES
INVENTOR
George W. Kaiser
By E. Wright
Att'y.

No. 764,597. Patented July 12, 1904.

UNITED STATES PATENT OFFICE.

GEORGE W. KAISER, OF WILMERDING, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

PRESSURE-REDUCING VALVE FOR AIR-BRAKES.

SPECIFICATION forming part of Letters Patent No. 764,597, dated July 12, 1904.

Application filed November 19, 1903. Serial No. 181,830. (No model.)

*To all whom it may concern:*

Be it known that I, GEORGE W. KAISER, a citizen of the United States, residing in Wilmerding, county of Allegheny, and State of Pennsylvania, have invented a certain new and useful Improvement in Pressure-Reducing Valves for Air-Brakes, of which improvement the following is a specification.

This invention relates to fluid-pressure brakes, and more particularly to what is known as the "high-speed" brake, which is now largely employed upon trains adapted to run at high rates of speed and in passenger service generally. The pressure usually carried in the high-speed-brake system is much greater than that previously used in ordinary train service, and in order to prevent such excessive brake-cylinder pressure as to cause a sliding of the wheels when running at slower speeds a pressure-reducing valve such as shown, for instance, in Patent No. 506,185, of October 3, 1893, has heretofore been employed for the purpose of limiting the brake-cylinder pressure to a predetermined amount in service applications and for gradually blowing down the high brake-cylinder pressure in emergency applications to this predetermined amount.

The object of this invention is to simplify the construction of valve devices of this type, dispensing with certain parts and reducing the cost of manufacture.

In the accompanying drawings, Figure 1 is a central sectional view of a valve device embodying my improvements; Fig. 2, a similar view, showing a modification; and Fig. 3, a corresponding view of the upper portion of a valve device, showing still another slight modification.

According to the structure shown in Fig. 1, my improved valve device comprises a casing 1, which may be formed in two or more parts, containing a cylindrical chamber 2, having an inwardly-projecting shoulder 3, forming an annular seat for the piston 4, which is provided with a suitably-guided upper stem 5 and a lower stem 6, which bears against the perforated cap 7 of the adjustable spring 8, having adjusting-nut 9 and lock-nut 10, with escape-openings 11 and 12. A through-port 13, having a tapered portion 15, is formed in the piston 4, and the port is normally held closed by means of a valve 16, which, as shown in Fig. 1, is provided with a stem having a tapered or conical portion 14, suspended in the port opening through the piston and coöperating with the tapered portion 15 of said opening. When the piston is in its normal or closed position seated against its gasket, the lower end of the stem 14 is preferably just out of contact with the inwardly-projecting flange 24 of the casing, so as to insure a complete closing of the valve 16. The pressure-chamber 2, above the piston, is adapted to be put in communication with the brake-cylinder by a pipe connection at 17 in the ordinary manner.

According to the modification shown in Fig. 2 the port and valve are located at the center of the piston, the valve being provided with a guided stem 19 and a light spring 23, while the tapered or conical post or projection 14, which is separate from the valve, is carried by a bridge-piece 18, secured to the casing, and coöperates with the tapered portion 15 of the escape-port through the piston. The adjusting-spring 8 has a cap 20, provided with a depending stem 22, and two or more upwardly-projecting stems 21, extending through the bridge-piece 18 for engaging the piston 4.

The modification shown in Fig. 3 is substantially the same as that of Fig. 2, with the exception that the port through the piston is formed at one side of the center, as in Fig. 1, and the tapered or conical post 14 is carried by the inwardly-projecting flange 24 of the casing.

The spring 8 is adjusted to hold a certain pressure—say sixty pounds per square inch— in the brake-cylinder, and so long as the brake-cylinder pressure does not exceed this amount the piston will remain seated against its shoulder 3 and the valve 16 will be held closed, so as to permit no escape of air through the device. When a service application of the brakes is made, which results in a brake-cylinder pressure in excess of the amount for which the spring is adjusted, the piston 4 is forced downward against the spring a distance sufficient to raise the escape-valve 16 a little way from its seat. The escape-port through the piston is then open its maximum area, which is the cross-section of the annular space around the tapered portion of the stem or post 14, and since the capacity of this port is made substantially equal to the service-port of the triple valve, through which air is admitted to the brake-cylinder, it will be evident that when the predetermined pressure is exceeded the air will escape from the brake-cylinder to the atmosphere at the same rate that it is admitted to the brake-cylinder, so that the pressure therein will be limited to this predetermined amount at which the spring is adjusted in all service applications. In the case of emergency applications air under pressure is charged into the brake-cylinder much more rapidly than it can escape through the port in the piston, so that a considerable pressure in excess of that to which the spring is adjusted is suddenly exerted upon the piston, forcing the same immediately down to its lowermost position. In this position the tapered portion 14 of the stem or post extends into the tapered portion of the through-port, so as to almost completely close the same, thus permitting at first a very slow escape of air from the brake-cylinder, which rate of flow gradually increases as the piston is moved upward by the spring against the diminishing brake-cylinder pressure, and the escape-opening becomes gradually larger until the maximum opening is reached. As soon as the brake-cylinder pressure is then reduced to the amount as determined by the adjustment of the spring the piston by a further movement is again seated against the shoulder and the escape-valve 16 is allowed to close, thus preventing further escape of air from the brake-cylinder.

It will now be evident that by means of this construction, in which the escape-port is formed through the piston, a compact and efficient form of pressure-reducing valve device is provided, which will automatically limit the brake-cylinder pressure to a predetermined and safe amount in service applications, while at the same time permitting a much higher brake-cylinder pressure in emergency applications, which higher pressure is gradually reduced down to said predetermined amount as the speed is diminished.

Having now described my invention, what I claim as new, and desire to secure by Letters Patent, is—

1. A pressure-reducing valve device containing a chamber, a piston therein exposed on one side to fluid-pressure, an adjustable load device acting on the other side of said piston, a port through said piston, means for closing said port when the piston is in its normal position, and means controlled by the movement of the piston for varying the size of the opening through said port.

2. A pressure-reducing valve device comprising a casing containing a chamber, a piston therein exposed to fluid-pressure and having a through-port, an adjustable load device opposing said pressure, means for closing said port-opening when the piston is in its normal position; and means for causing a maximum opening of said port upon a short movement of the piston and a minimum opening upon a full movement of the piston.

3. A pressure-reducing valve device comprising a casing containing a chamber, a piston therein exposed to fluid-pressure and having an escape-port opening through the same, an adjustable load device opposing said pressure, a valve for normally closing said port, and means operated by the movement of the piston for gradually varying the area of the escape-port opening.

4. A pressure-reducing valve device containing a chamber adapted to be connected with a brake-cylinder, a piston exposed to the pressure of said chamber and having an escape-port opening therethrough, an adjustable spring acting on said piston, means for normally closing said port, and means operated by a short movement of the piston from its normal position for opening the maximum area of the escape-port and by a further movement to gradually diminish the area of said opening.

5. A pressure-reducing valve device comprising a casing containing a chamber, a piston therein exposed to brake-cylinder pressure and having an escape-port opening therethrough, an adjustable spring acting on said piston, means for normally closing said port, and a tapered stem or post for gradually varying the area of the escape-opening as the piston moves out against the spring.

6. A pressure-reducing valve device comprising a casing containing a chamber, a piston therein exposed to brake-cylinder pressure and having an escape-port opening therethrough, an adjustable spring acting on said piston, a valve normally closing said port, and a tapered stem secured to said valve.

7. A pressure-reducing valve device comprising a casing containing a chamber, a piston therein exposed to fluid-pressure and having a tapered escape-port opening therethrough, an adjustable spring acting on said piston, a valve normally closing said port, and a stem extending into said tapered escape-opening.

8. A pressure-reducing valve device comprising a casing containing a chamber, a piston therein exposed to fluid-pressure and having a tapered port opening therethrough, an adjustable spring acting on said piston, a valve normally closing said port, and a tapered stem extending into said escape-opening.

In testimony whereof I have hereunto set my hand.

GEORGE W. KAISER.

Witnesses:
R. F. EMERY,
JAS. B. MACDONALD.